(12) United States Patent
Yanagisawa et al.

(10) Patent No.: US 8,183,735 B2
(45) Date of Patent: May 22, 2012

(54) ROTATING ELECTRICAL MACHINE

(75) Inventors: Yukiyoshi Yanagisawa, Hitachi (JP);
Takeshi Kuwahara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 12/436,478

(22) Filed: May 6, 2009

(65) Prior Publication Data
US 2009/0315429 A1  Dec. 24, 2009

(30) Foreign Application Priority Data
Jun. 18, 2008  (JP) ................................. 2008-158574

(51) Int. Cl.
*H02K 1/06*  (2006.01)
(52) U.S. Cl. ... 310/216.071; 310/216.011; 310/216.059; 310/216.061; 310/216.062
(58) Field of Classification Search .................. 310/216.011–216.013, 216.045, 310/216.054, 216.059, 216.061, 216.069, 310/216.071–216.073, 261.1
See application file for complete search history.

(56) References Cited

U.S. PATENT DOCUMENTS

| | | | | | |
|---|---|---|---|---|---|
| 3,652,889 | A | * | 3/1972 | Reece et al. | 310/216.011 |
| 3,787,744 | A | * | 1/1974 | Saito | 310/216.011 |
| 4,264,836 | A | * | 4/1981 | Dukshtau et al. | 310/216.011 |
| 4,489,249 | A | * | 12/1984 | Olivier | 310/216.011 |
| 2003/0127937 | A1 | * | 7/2003 | Kanno et al. | 310/216 |

FOREIGN PATENT DOCUMENTS

| | | |
|---|---|---|
| JP | 5-15093 A | 1/1993 |
| JP | 05015093 A * | 1/1993 |

* cited by examiner

*Primary Examiner* — Quyen Leung
*Assistant Examiner* — Jose Gonzalez Quinones
(74) *Attorney, Agent, or Firm* — Mattingly & Malur, PC

(57) ABSTRACT

The present invention provides a rotating electrical machine including a rotor core that does not produce narrow areas in rotor slots even if circumferential ends of fan-shaped segment cores are displaced radially outwardly and circumferentially during operation. In the present invention, slots near circumferential ends of the fan-shaped segment cores are made larger than slots in circumferential intermediate portions of the segment cores. With such a configuration, even if the circumferential ends of the segment cores are displaced radially outwardly and circumferentially during operation, the circumferential ends of the segment cores forming the large slots do not protrude into the slots formed in the circumferential intermediate portions of axially adjacent segment cores, thereby preventing narrow areas from being produced in the rotor slots.

6 Claims, 5 Drawing Sheets

ROTATING ELECTRICAL MACHINE

BACKGROUND OF THE INVENTION

The present invention relates to a rotating electrical machine such as a vertical axis water turbine generator or a horizontal axis large electric motor, and more particularly, to a rotating electrical machine in which fan-shaped segment cores are used in a rotor core.

A rotating electrical machine using fan-shaped segment cores in a rotor core has been proposed as disclosed in, for example, JP-A-5-15093.

Generally, a rotating electrical machine using fan-shaped segment cores in a rotor core includes a rotor core constituted by annular steel plates axially stacked up to a required size, each annular steel plate being formed by circumferentially arranging a plurality of fan-shaped segment cores. In stacking the annular steel plates, ends of segment cores of adjacent annular steel plates in a stacking direction are circumferentially shifted so as not to be aligned with each other.

In the rotating electrical machine including the rotor core constituted by the segment cores, high speed rotation during operation may cause circumferential ends of the segment cores to be displaced radially outwardly as compared with circumferential intermediate portions of the segment cores. Particularly, portions closer to the circumferential ends of the segment cores than fastening bolts passing through the segment cores may be displaced radially outwardly.

This displacement causes slots formed near the circumferential ends of the segment cores to be shifted radially outwardly and circumferentially inwardly with respect to slots formed in circumferential intermediate portions of segment cores of the adjacent annular steel plate in the stacking direction. The shift of the slots cause peripheral edges of the slots near the circumferential ends of the segment cores to protrude into slots of the rotor core formed axially to produce narrow areas in the rotor slots, and rotor windings may abut against the circumferential ends of the segment cores forming the narrow areas to damage insulation of the rotor windings.

SUMMARY OF THE INVENTION

The present invention has an object to provide a rotating electrical machine including a rotor core that does not produce narrow areas in rotor slots even if circumferential ends of segment cores are displaced radially outwardly and circumferentially during operation.

In order to achieve the above described object, in a rotating electrical machine according to a first aspect of the present invention, slots of fan-shaped segment cores formed near circumferential ends thereof are made larger than slots formed in circumferential intermediate portions of the fan-shaped segment cores.

In a rotating electrical machine according to a second aspect of the present invention, slots of fan-shaped segment cores are made larger from circumferential intermediate portions toward circumferential ends of the segment cores.

In a rotating electrical machine according to a third aspect of the present invention, slots of fan-shaped segment cores positioned closer to circumferential ends of the segment cores than fastening bolts passing through the segment cores are made larger than slot positioned in circumferential intermediate portions of the segment cores.

With such configurations, even if the circumferential ends of fan-shaped segment cores are displaced radially outwardly and circumferentially during operation of the rotating electrical machine, peripheral edges of the larger slots do not protrude into slots in adjacent segment cores stacked in the axial direction, thereby preventing narrow areas from being produced in the rotor slots.

As described above, the present invention can provide a rotating electrical machine including fan-shaped rotor cores that do not produce narrow areas in the rotor slots even if circumferential ends of the fan-shaped segment cores are displaced radially outwardly and circumferentially during operation.

Other objects, features and advantages of the invention will become apparent from the following description of the embodiments of the invention taken in conjunction with the accompanying drawings.

DETAILED DESCRIPTION OF THE INVENTION

Figure 1:
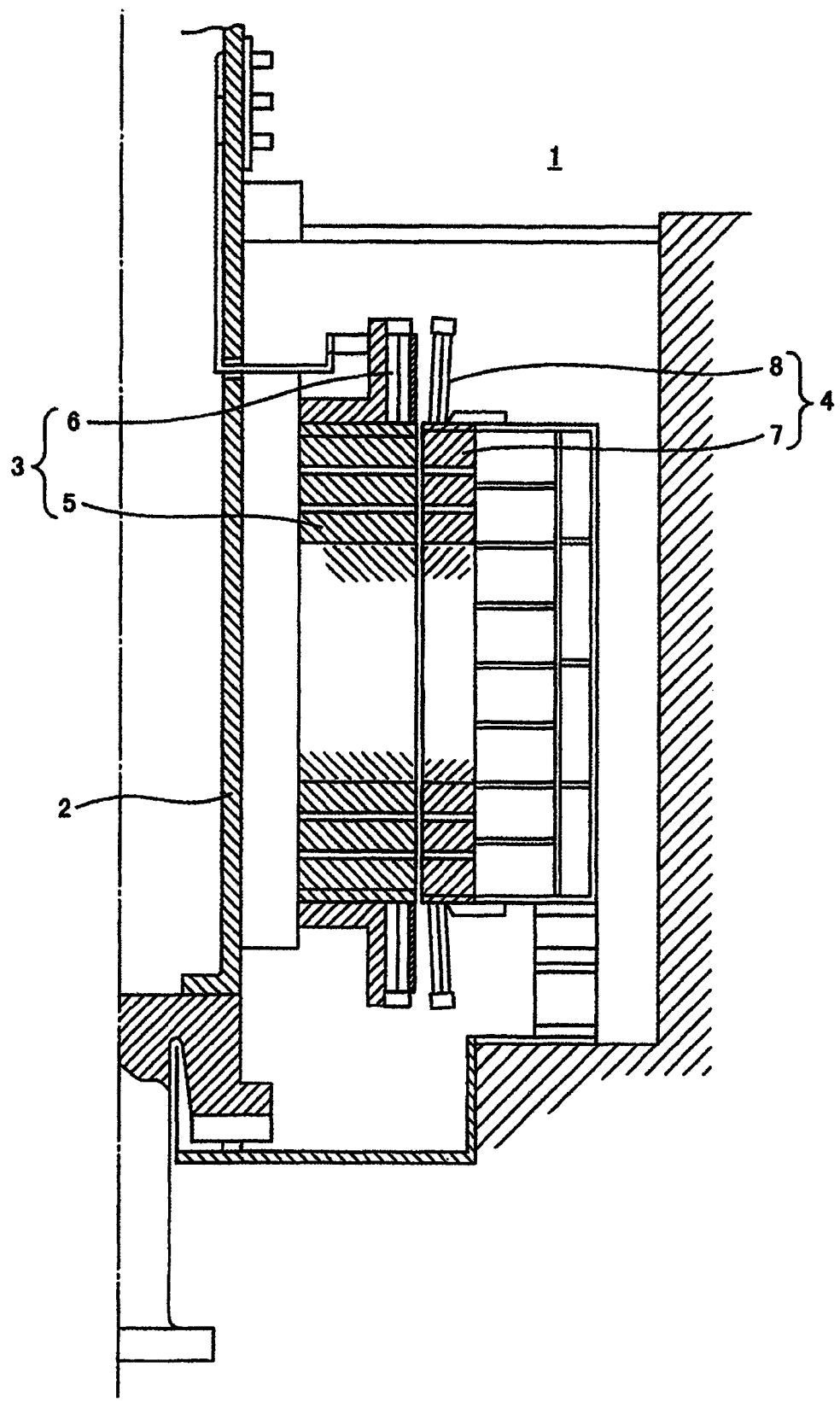
FIG. 1 is a schematic vertical sectional view of a right half of a water turbine generator as an embodiment of a rotating electrical machine according to the present invention.
Figure 2:
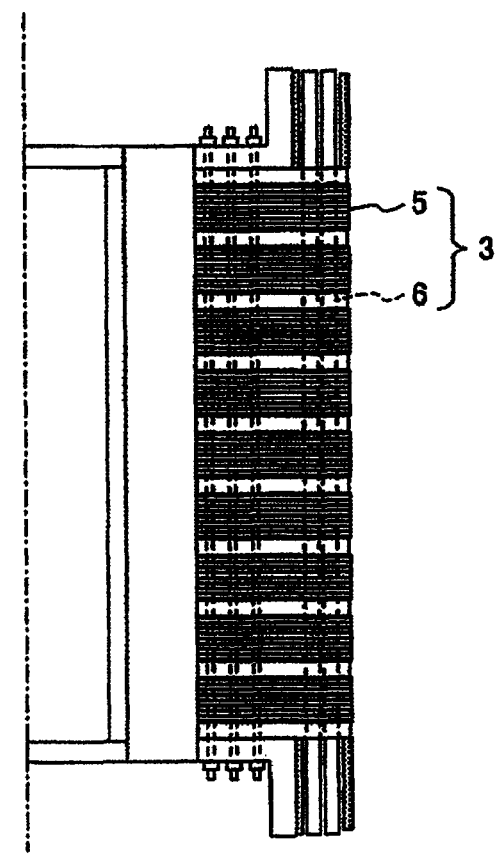
FIG. 2 is a schematic vertical sectional view of a right half of a rotor of the water turbine generator shown in FIG. 1.

Hereinafter, a water turbine generator as an embodiment of a rotating electrical machine according to the present invention will be described with reference to FIGS. 1 to 7.

A water turbine generator 1 includes a rotor 3 secured to a vertical rotating shaft 2, and a stator 4 radially spaced from the rotor 3, and an unshown water turbine is coupled to a lower portion of the vertical rotating shaft 2.

The rotor 3 includes a rotor core 5 constituted by annular steel plates axially stacked up to a required size, and rotor windings 6 mounted in rotor slots 11, 11A formed on an outer periphery of the rotor core 5. The stator 4 includes a stator core 7, and stator windings 8 mounted in stator slots formed on an inner periphery of the stator core 7.

Figure 3:
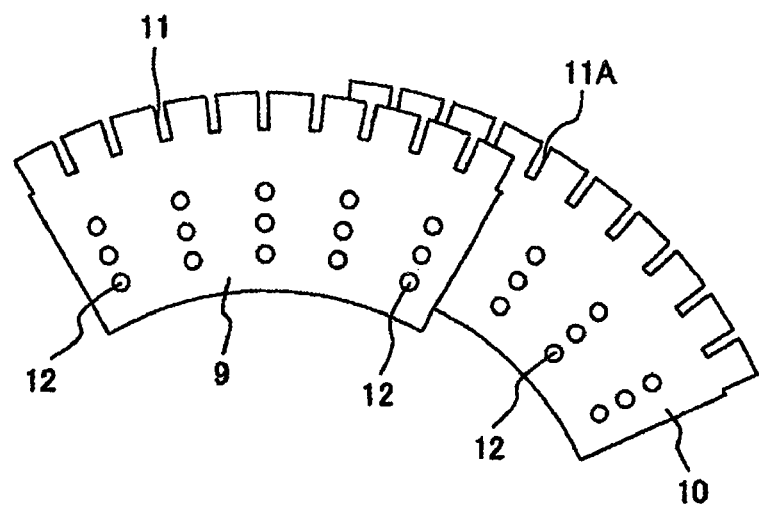
FIG. 3 is a plan view of fan-shaped segment cores constituting a rotor core of the rotor shown in FIG. 2.
Figure 4:
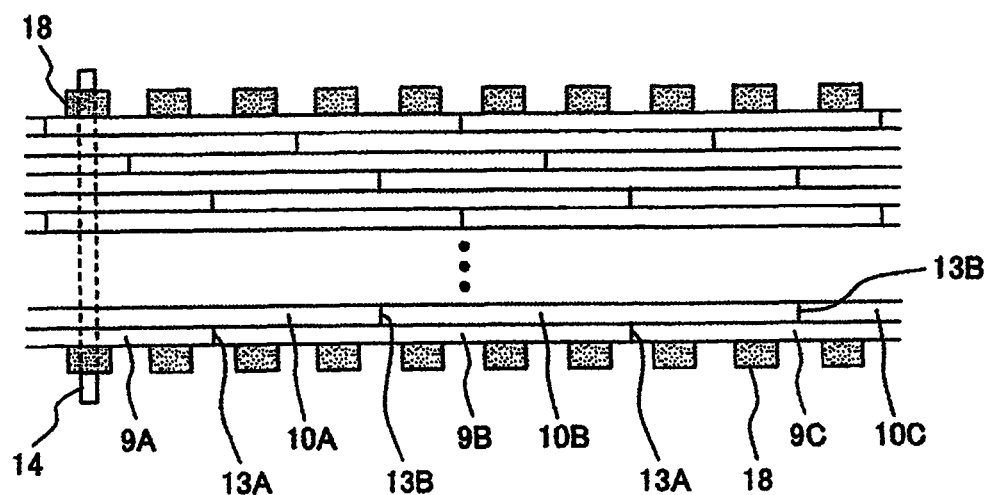
FIG. 4 is a side view of the fan-shaped segment cores shown in FIG. 3 being stacked.
Figure 5:
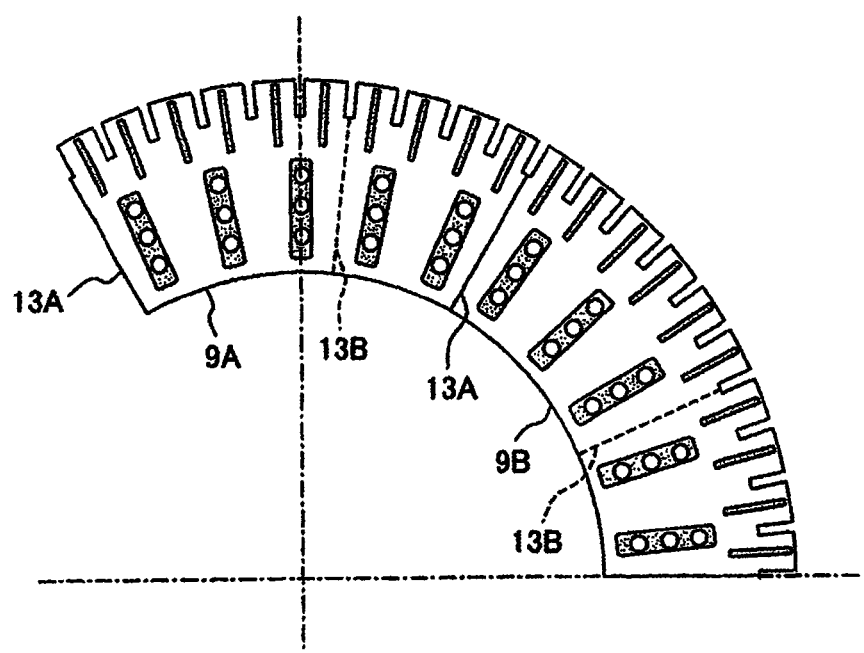
FIG. 5 is a plan view of the fan-shaped segment cores shown in FIG. 3 formed into an annular steel plate.

The rotor core 5 is formed by axially stacking annular steel plates as shown in FIG. 4, each annular steel plate being formed by circumferentially arranging segment cores 9, 10 adjacent to each other as shown in FIG. 5, and the segment cores being fan-shaped steel plates and having a plurality of slots 11, 11A formed on outer periphery as shown in FIG. 3.

Specifically, when adjacent segment cores 9A, 9B, 9C . . . are arranged circumferentially adjacent to each other to form an annular steel plate and the annular steel plates are axially stacked as shown in FIGS. 4 and 5, joints (ends) 13A of the segment cores 9A, 9B, 9C . . . of the annular steel plate in a first layer and joints (ends) 13B of segment cores 10A, 10B, 10C . . . of an annular steel plate in a second layer are circumferentially shifted. In other words, the annular steel plates are stacked so that the joints (ends) 13A of the segment cores 9A, 9B, 9C . . . and the joints (ends) 13B of the segment cores 10A, 10B, 10C . . . of adjacent annular steel plates in a stacking direction are circumferentially shifted so as not to be axially aligned with each other, thereby ensuring strength of the rotor core 5.

In the segment cores 9, 10, a plurality of bolt through holes 12 are formed in addition to the slots 11, 11A. After the annular steel plates are stacked up to a predetermined size, fastening bolts 14 are passed through the bolt through holes 12 to fasten with nuts (not shown) from opposite sides.

Figure 6:
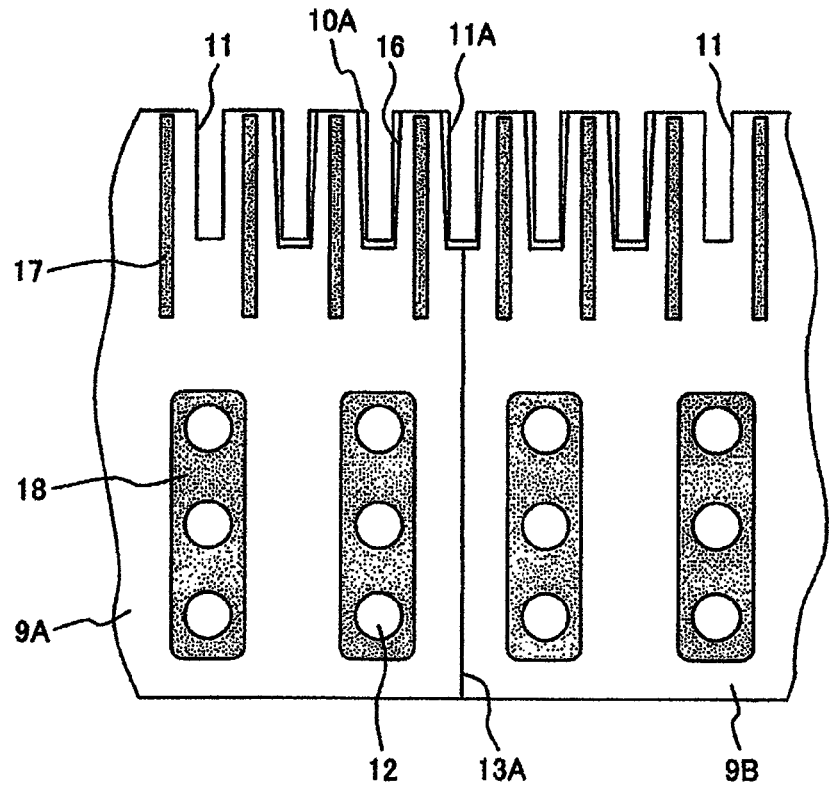
FIG. 6 is an enlarged view of a joint of the fan-shaped segment cores shown in FIG. 5.
Figure 7:
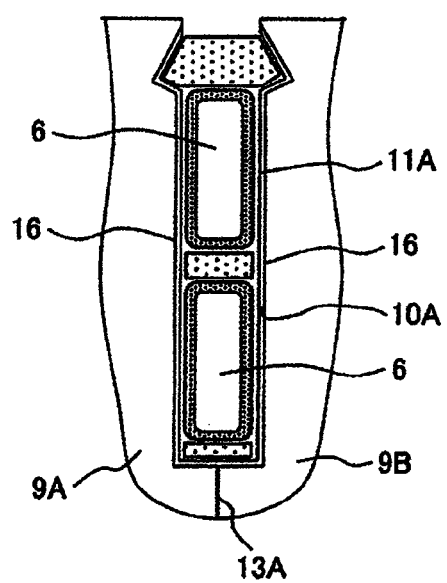
FIG. 7 is an enlarged sectional view of a slot and a rotor winding formed in the joint shown in FIG. 6.

Among the slots in the segment cores 9 (9A, 9B, 9C . . . ) and 10 (10A, 10B, 10C . . . ), slots 16 formed near opposite circumferential ends of the segment cores have a higher radial height and a larger circumferential width than the slots 11, 11A formed in circumferential intermediate portions of the segment cores 9, 10 as shown in FIG. 6. Thus, at a joint 13A between the segment cores 9A and 9B, as shown in FIG. 7, a peripheral edge of the slot 11A in the segment core 10A adjacent to the segment cores 9A and 9B in the stacking direction faces into the slot 16.

Further, the rotor core 5 includes ventilating ducts extending from the inner diameter side to the outer diameter side for each predetermined stacking size to pass cooling air from the inner diameter side to the outer diameter side, and duct spacers 17 having a thickness equal to a width of the ventilating ducts are provided and duct spacers 18 are provided around the bolt through holes 12. Though not shown, protrusions extending in the stacking direction of the annular steel plates are formed on the duct spacers 17, and are engaged into engagement holes formed in the stacked rotor cores 5, thereby preventing the duct spacers 17 from being displaced radially outwardly by a centrifugal force during operation.

Upon fastening of the stacked cores, fastening forces acting on the duct spacers 18 positioned on the inner diameter side are higher than those to the duct spacers 17 because of a need for firm fastening of the rotor cores 5 and a relationship with placement positions of the fastening bolts 14.

According to the embodiment, the rotor core 5 is configured as described above, thereby preventing narrow areas from being produced in the rotor slots even if high speed rotation of the water turbine generator 1 during operation causes the circumferential ends of the segment cores 9, 10 to be displaced radially outwardly and circumferentially.

Figure 8:
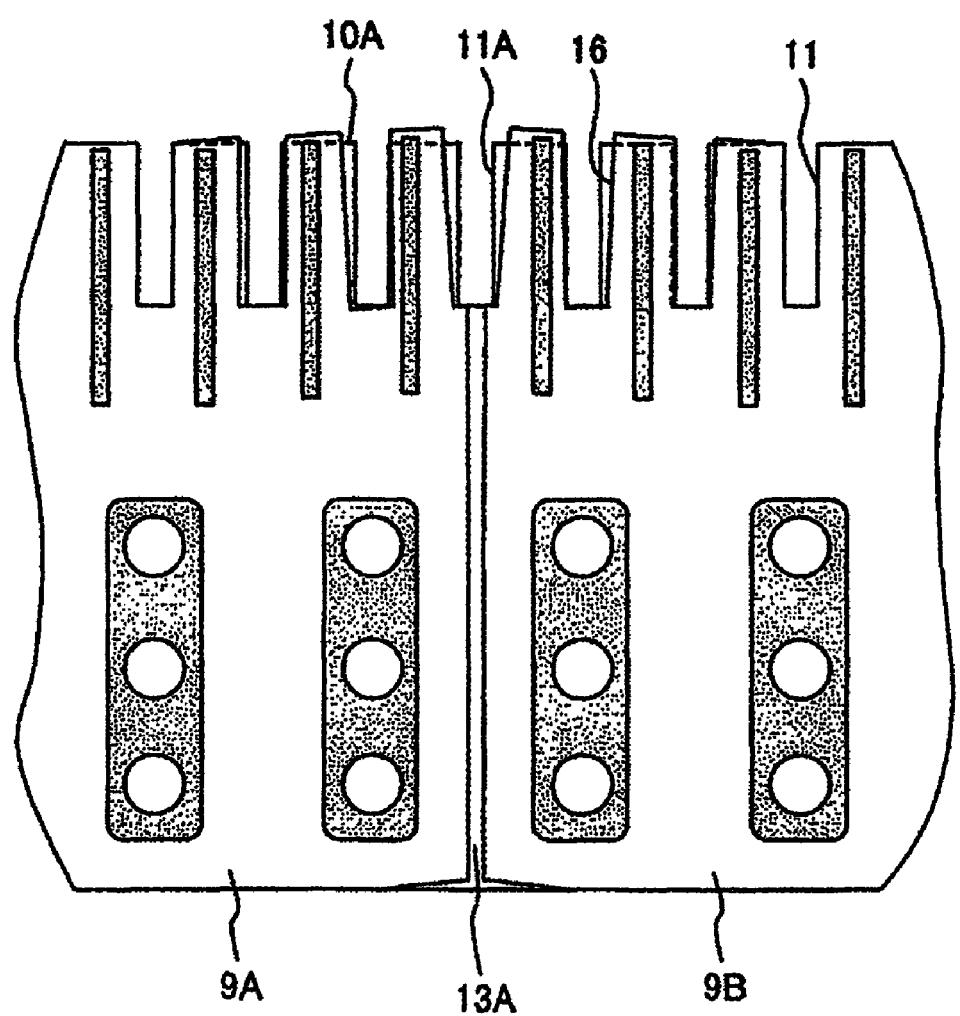
FIG. 8 is a view corresponding to FIG. 6 showing displacement of the circumferential ends of the fan-shaped segment cores.

During operation of the water turbine generator 1, opposite circumferential ends of the segment cores 9, 10 constituting the rotor core 5 receive a centrifugal force by rotation of the rotor 3 and are displaced radially outwardly and circumferentially even when the segment cores are fastened by the fastening bolt 14 and the nut as shown in FIG. 8.

Specifically, when segment cores 9 for one layer are seen from an inner diameter side, a circumferential force cannot be transferred at joints (ends) 13A between adjacent segment cores 9A, 9B, but the circumferential force can be transferred by a friction force within contact surfaces of the duct spacers 17, 18, via adjacent segment cores 10 stacked in the stacking direction, thereby allowing a coupling state of the annular steel plate to be maintained during operation. This transfer of the circumferential force causes substantially uniform elastic deformation of the segment cores 9 in the circumferential direction, but the circumferential force does not act at the joints (ends) 13A, so that circumferential elastic deformation does not occur at the joints (ends) 13A. Therefore, at the joints (ends) 13A, a circumferential displacement is caused between the adjacent segment cores 9 and 10 in the stacking direction.

By such circumferential displacement, portions near the opposite circumferential ends that are the joint (ends) 13A between the segment cores 9A and 9B are displaced radially outwardly in a state in which the annular steel plate is kept.

Therefore, no gap is produced at the joint (ends) 13A during stop of the operation, while a gap is produced at the joint (ends) 13A during operation. A fastening force is applied to portions near the slot 16 formed at the joint (ends) 13A via the duct spacers 17, but the fastening force is smaller than the fastening force applied to the duct spacers 18 on the inner diameter side, and thus a friction force between the segment cores 9 and 10 stacked in the stacking direction is small, and the portions near the slot 16 are displaced radially outwardly and circumferentially to be tilted.

However, the slot 16 formed near the joint (ends) 13A has a larger size than the slot 11A positioned in the circumferential intermediate portion of the adjacent segment core 10A in the stacking direction (axial direction), and thus even if the portion near the joint (end) 13A between the segment cores 9A and 9B is displaced radially outwardly and circumferentially, a peripheral edge of the slot 16 does not protrude into the slot 11A.

As a result, the displacement of the circumferential ends of the segment cores 9A and 9B does not produce a narrow area in the rotor slot extending over the entire axial length, and thus the rotor winding 6 does not come into contact with the circumferential ends of the segment cores the rotor slot, thereby eliminating the problem of damage to an insulation layer of the rotor winding 6.

Since the fastening bolts 14 are positioned up to near the opposite circumferential ends of the segment cores, an amount of displacement of the opposite circumferential ends of the segment cores 9, 10 during operation of the water turbine generator 1 is the largest at the ends of the segment cores 9 and 10 beyond the fastening bolts 14 positioned near the opposite circumferential ends of the segment cores 9, 10, and becomes smaller toward the circumferential intermediate portion of the segment cores 9, 10.

Accordingly, by forming a slot 16 at a position where the amount of displacement of the segment cores is the largest larger than the other slots, it is possible to prevent a peripheral edge of the slot 16 from significantly protruding into the rotor slot extending over the entire axial length of the rotor core 5, and to prevent damage of a slot insulation material in the slot or an insulation layer of the rotor winding 6.

On the other hand, the circumferential ends of the segment core 9 are significantly displaced and the amount of the displacement becomes smaller toward the intermediate portion of the segment core. Thus, by forming the slots 16 at the circumferential ends of the segment cores 9 and 10 the largest, slots progressively smaller toward the circumferential intermediate portion, and a slot finally the same as the slots 11, 11A at a circumferential center, in other words, by forming the slots progressively larger from the circumferential center toward the circumferential ends of the segment core in accordance with the amount of the displacement, it is possible to prevent the edge of the slot 16 from protruding into the rotor slot extending axially over the entire length of the rotor core 5.

In the above description, the slot 16 is increased in width at opposite sides in a width direction as compared with the slots 11 and 11A, but the slot 16 may be increased in width at only a side with the edge of the slot 16 protruding into the rotor slots by the displacement. Further, noting only the width direction of the slot, half slots formed in the circumferential ends of the segment cores 9 and 10 do not need to be increased in width because the displacement does not cause the edge of the slot to protrude into the slot 11A formed in the adjacent segment core in the stacking direction.

Thus, in the embodiment, by forming the slots positioned closer to the circumferential ends than the fastening bolts in the circumferential direction of the segment cores 9 and 10 larger than the other slots, it is possible to prevent damage to the rotor winding 6 by the displacement of the segment cores 9 and 10 radially outwardly and circumferentially.

As an example of a rotating electrical machine, the water turbine generator 1 has been described above, but the present invention can be, of course, applied to any rotating electrical machine using fan-shaped segment cores in a rotor core.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electrical machine including a rotor core comprising annular steel plates axially stacked, each annular steel plate being formed by a plurality of fan-shaped segment cores arranged circumferentially and having a plurality of slots formed in outer peripheral portions thereof, and the annular steel plates being axially stacked so that ends of the segment cores of adjacent annular steel plates in a stacking direction are circumferentially shifted so as not to be aligned with each other,
wherein slots near circumferential ends of each segment core are made larger than slots in a circumferential intermediate portion of the each segment core.

2. The rotating electrical machine according to claim 1, wherein the slots formed in and near the circumferential ends of the segment cores are made larger in width and height than the slots in the circumferential intermediate portions of the segment cores.

3. A rotating electrical machine including a rotor core comprising annular steel plates axially stacked, each annular steel plate being formed by a plurality of fan-shaped segment cores arranged circumferentially and having a plurality of slots formed in outer peripheral portions thereof, and the annular steel plates being axially stacked so that ends of the segment cores of adjacent annular steel plates in a stacking direction are circumferentially shifted so as not to be aligned with each other,
wherein the slots of the fan-shaped segment cores are made larger from circumferential intermediate portions toward circumferential ends of the segment cores.

4. The rotating electrical machine according to claim 3, wherein the slots formed in and near the circumferential ends of the segment cores are made larger in width and height than the slots in the circumferential intermediate portions of the segment cores.

5. A rotating electrical machine including a rotor core comprising annular steel plates axially stacked and a plurality of fastening bolts passing through the stacked annular steel plates to fasten them with nuts, each annular steel plate being formed by a plurality of fan-shaped segment cores arranged circumferentially and having a plurality of slots formed in outer peripheral portions thereof, and the annular steel plates being axially stacked so that ends of the segment cores of adjacent annular steel plates in a stacking direction are circumferentially shifted so as not to be aligned with each other,
wherein slots of the fan-shaped segment cores positioned closer to circumferential ends of the segment cores than the fastening bolts passing through the segment cores are made larger than slots positioned in circumferential intermediate portions of the segment cores.

6. The rotating electrical machine according to claim 5, wherein the slots formed in and near the circumferential ends of the segment cores are made larger in width and height than the slots in the circumferential intermediate portions of the segment cores.

* * * * *